United States Patent [19]
Partyka et al.

[11] 3,751,018
[45] Aug. 7, 1973

[54] METHOD OF BAND-SYSTEM HARDENING OF THIN-WALLED STEEL PRODUCTS, PARTICULARLY OF SCRAPER CONVEYOR TROUGHS, AND THE DEVICE FOR IMPLEMENTATION OF THIS METHOD

[76] Inventors: Henryk Partyka, ul. Zacisze 4, Jawarzno; Stanislaw Jankowski, ul. Dlugosza 10, Rybnik; Jerzy Manka, ul. Ofiar Terroru 12, Rydultowy, all of Poland

[22] Filed: Nov. 15, 1971

[21] Appl. No.: 198,851

[30] Foreign Application Priority Data
Nov. 14, 1970  Poland.......................... P. 144 422

[52] U.S. Cl................ 266/4 E, 148/144, 148/150, 148/152, 266/4 S
[51] Int. Cl............................................ C21d 1/66

[58] Field of Search...................148/143-145, 148, 150-152; 266/3 R, 4 R, 4 E, 4 F, 4 S

[56] References Cited
UNITED STATES PATENTS
3,352,724   11/1967   McNitt et al. .................. 148/144

*Primary Examiner*—Gerald A. Dost
*Attorney*—Eric H. Waters, John G. Schwartz et al.

[57] ABSTRACT

A thin-walled steel product such as a conveyor trough is hardened in a surface thereof by means of heat-treatment. The heat-treatment comprises heating the surface to be hardened progressively in a longitudinal band thereof and progressively cooling the surface by spraying a coolant thereon. In order to prevent deformation of the product, its opposite surface is cooled after the heating of the surface to be hardened but before cooling of this latter surface.

6 Claims, 2 Drawing Figures

METHOD OF BAND-SYSTEM HARDENING OF THIN-WALLED STEEL PRODUCTS, PARTICULARLY OF SCRAPER CONVEYOR TROUGHS, AND THE DEVICE FOR IMPLEMENTATION OF THIS METHOD

BACKGROUND OF THE INVENTION a. Field of the Invention

The invention relates to a method of hardening thin-walled steel products in bands, and particularly to steel products which are required to maintain their shape and dimensions, such as scraper conveyor troughs.

The invention also relates to apparatus for achieving such hardening.

b. Prior Art

Band-system surface hardening methods of thin-walled steel products are presently known, expecially for scraper conveyor troughs. Such known methods includes advancing a heating means such as acetylene burners or induction heating coils with respect to the product being hardened, and effecting spray cooling of the heated surface at a small distance downstream of the heating means.

There are also known such band-system hardening methods, in which the burners or heating coils and the spray nozzles are stationary, while the product being hardened is moved in relation to them.

The heating and cooling parameters, such as feed speed, amount of heat supplied, and thus the heating temperature, as well as the amount of cooling liquid discharged are regulated in dependence on the required structure and hardness after hardening.

The known methods and apparatus for band hardening have the drawback that the local and intensive heating of the thin wall of a product causes a detrimental deformation of these walls, while the rapid cooling is disadvantageous with regard to removal of such deformation.

In the case of scraper conveyor troughs the effect of the deformation consists in widening of the upper trough, and narrowing of the lower trough. These deformations, especially the narrowing of the lower trough is not permissible due to the necessity of regular cooperation of conveyor chains with the trough. A restoring of the previous shape of the trough by a cold straightening method is very complex, and is capable of involving a destruction of the side webs of the trough. This procedure requires the application of great forces, and an additional difficulty is that the place of deformation after hardening is not susceptible to bending in reverse direction.

The magnitude of deformation depends on inner stresses in the trough, mainly welding stresses, and these cannot be predetermined and possibly taken into account during construction of the trough.

These drawbacks cause the production of a hardened trough to require substantial manual labor with a large number of rejects.

SUMMARY OF THE INVENTION

An object of the invention is to provide an apparatus and a method of band hardening thin wall structures in which the effect of deformation is limited to acceptable tolerances.

This object is achieved by the method of the invention by effecting additional cooling of the product being hardened on the surface opposite to that being hardened. Moreover, such additional cooling is effected by a cooling spray which precedes the hardening spray.

The hardening apparatus is constructed so that during hardening the product is in a substantially horizontal position, and the cooling liquid is discharged upon the product from above. Such cooling liquid, i.e., the hardening spray, is called the upper spray, whereas the additional cooling is effected from below and this cooling spray is called the lower spray. The surface being hardened, is correspondingly, the upper surface, and the surface of the product opposite to the hardened surface is the lower surface.

During hardening by the method according to the invention, there occur in the process the following phases: due to a strong local heating, while the remainder of the body is cold and rigid, there occur deformation of the heated layer upwards due to higher temperature.

The cooling of the lower surface immediately after heating causes an immediate cooling of the lower layer of the body, while the upper layer is kept in heated condition, and this brings about a bending of the entire wall, according to the deformation on the lower surface or convexity downwards.

The upper spray is retarded in relation to the lower spray, and thereafter cools the upper layer of the wall being hardened, and this causes a bending of the whole wall in accordance with the curvature on this surface, or upwards. This is contrary to the curvature resulting from cooling of the lower surface.

By choosing a proper magnitude of advance of the lower spray in relation to the upper spray, a state can be obtained in which the resulting deformation can be made substantially equal to zero.

This ensures maintaining the previous shape and dimensions of the body after completion of the operation of band-system hardening.

The apparatus for implementation of the method described above is characterized in that additional nozzles for the lower spray are provided, which are slidably mounted for adjustment of their longitudinal position in relation to the upper spray nozzles which are stationary.

DETAILED DESCRIPTION

Figure 1:
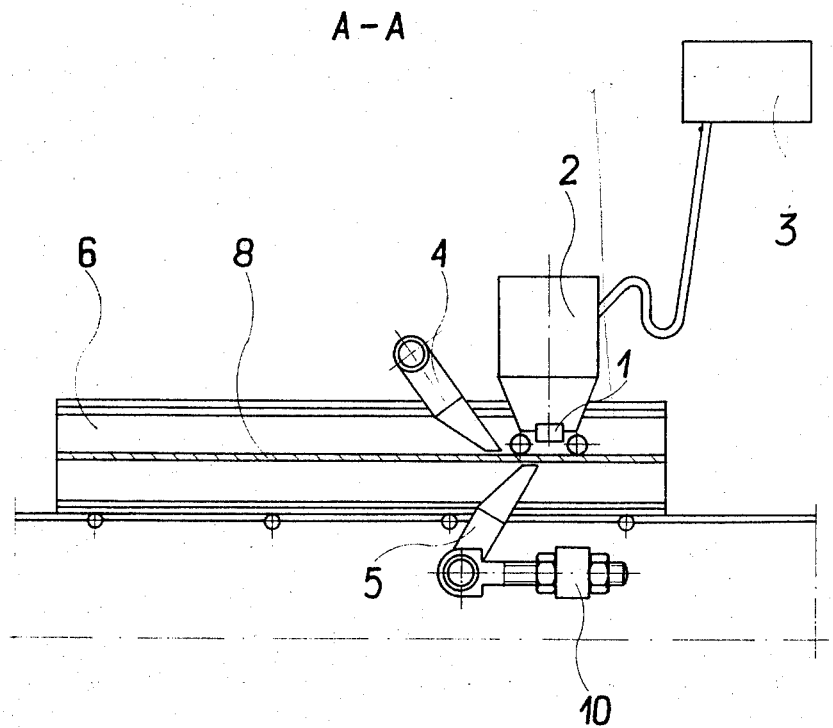
FIG. 1 is a longitudinal sectional view taken along line A-A in FIG. 2.
Figure 2:
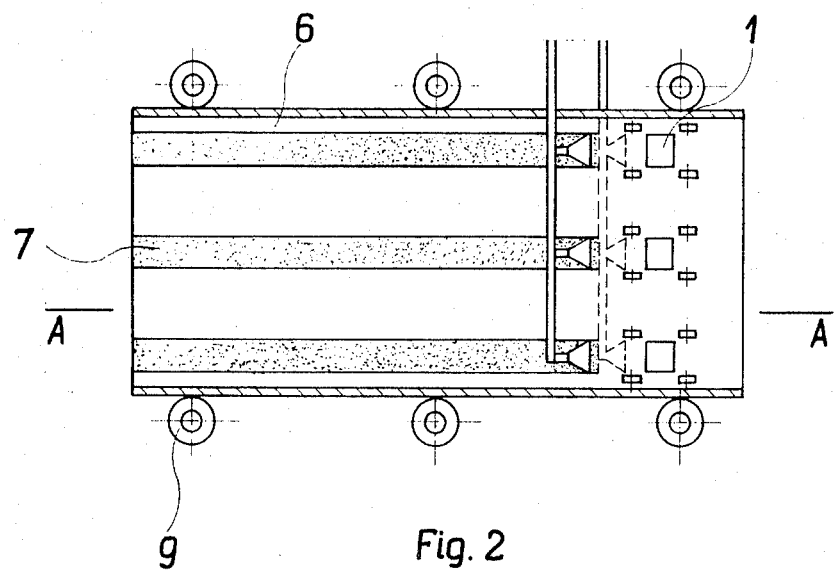
FIG. 2 is a plan view of a portion of the heat treatment apparatus according to the invention for hardening scraper conveyor troughs.

Referring to the drawing, therein is shown apparatus for heating scraper conveyor troughs, the apparatus comprising conventional induction heating coils 1 secured in a stationary housing 2 and connected with frequency transformer 3. The coils 1 are transversely spaced to effect heating of the upper surface of a steel plate 8 of a scraper conveyor trough in bands 7. The trough is intended to be hardened at the upper surface in the region of the bands 7 as this is where the trough is intended to be associated with a chain track for advancement of the trough in the course of its use as a scraper conveyor trough. Specifically, such troughs are used in mines for transport of excavated material.

The trough is advanced in the heat treating apparatus by a conveyor mechanism 9 from left to right in the drawing. Located downstream of coils 1 in alignment therewith are nozzles 4 for discharge of a cooling spray onto the upper surface of the plate 8. Also located in alignment with coils 1 are nozzles 5 for discharge of a cooling spray onto the lower surface of plate 8. The nozzles 5 are located closer to the coils 1 than are nozzles 4. The longitudinal position of nozzles 5 can be adjusted by means of mechanism 10. Coils 1 and nozzles 4 are stationary.

By cooling the lower surface of plate 8 after the upper surface has been heated but before the upper surface has been cooled, the plate ia deformed in a manner to compensate for the deformation when the upper surface is cooled whereby the resulting deformation of plate 8 will be substantially equal to zero.

By the elimination of the deformation of thin-walled steel products in the process of band surface hardening, the quality is improved and the need for great amounts of labor to counteract deformation is avoided. Furthermore, the amount of rejects is substantially diminished.

What is claimed is:

1. Apparatus for hardening a thin-walled steel product in a longitudinal band thereof, said apparatus comprising heating means, means for providing relative longitudinal displacement between a thin-walled steel product to be hardened and said heating means to provide progressive heating of one surface of the product in a longitudinal band thereof, first cooling means facing said one surface of the product and located downstream of the heating means for cooling said one surface in the region of said longitudinal band, and second cooling means facing the opposite surface of the product and located downstream of the heating means for cooling said opposite surface in the region of said longitudinal band, said first cooling means being further downstream from the heating means than said second cooling means.

2. Apparatus as claimed in claim 1 wherein said heating means comprises an induction heating coil.

3. Apparatus as claimed in claim 1 wherein each of said first and second cooling means respectively comprises a spray nozzle in longitudinal alignment with said heating means.

4. Apparatus as claimed in claim 1 comprising means supporting said second cooling means for longitudinal adjustment of position with respect to the heating means.

5. Apparatus as claimed in claim 1 wherein said heating means comprises a plurality of transversely spaced induction coils adapted to heat the product in an equal plurality of transversely spaced longitudinal bands, said first cooling means comprising a plurality of spray nozzles located in alignment with respective bands, and a common support for said spray nozzles, said second cooling means comprising a plurality of further spray nozzles located in alignment with respective bands, and a common support for the further spray nozzles.

6. Apparatus as claimed in claim 1 wherein the means for providing relative longitudinal displacement between the product and the heating means comprises conveyor wheels laterally engaging said product to feed the same past the heating means.

* * * * *